W. S. MANLEY.
PAINT REMOVING DEVICE.
APPLICATION FILED DEC. 3, 1920.

1,408,623.

Patented Mar. 7, 1922.

Inventor
W. S. MANLEY
By Monroe E. Miller
Attorney

UNITED STATES PATENT OFFICE.

WILLIAM SHERMAN MANLEY, OF SEDALIA, MISSOURI.

PAINT-REMOVING DEVICE.

1,408,623.   Specification of Letters Patent.   Patented Mar. 7, 1922.

Application filed December 3, 1920. Serial No. 428,001.

*To all whom it may concern:*

Be it known that I, WILLIAM S. MANLEY, a citizen of the United States, residing at Sedalia, in the county of Pettis and State of Missouri, have invented certain new and useful Improvements in Paint-Removing Devices, of which the following is a specification, reference being had therein to the accompanying drawing.

The present invention relates to a device for removing paint from the surfaces of railroad cars, buildings, and the like, and aims to provide a novel and improved device of that kind providing for the blistering or loosening of the paint by heat, without danger of burning the wood.

Another object is the provision of a paint removing device of simple and inexpensive construction including a casing containing the source of heat, for transmitting the heat to the painted surface, and to protect the wood against being burned.

A further object is the provision of such a device having novel means for scraping the blistered or loosened paint from the wood.

A still further object is the provision of a device of that kind having a novel construction and arrangement of the casing and handles to provide an inexpensive and simple construction and assemblage of the component parts.

With the foregoing and other objects in view, which will be apparent as the description proceeds, the invention resides in the construction of arrangement of parts hereinafter described and claimed, it being understood that changes can be made within the scope of what is claimed without departing from the spirit of the invention.

The invention is illustrated in the accompanying drawings, wherein:—

Figure 1:
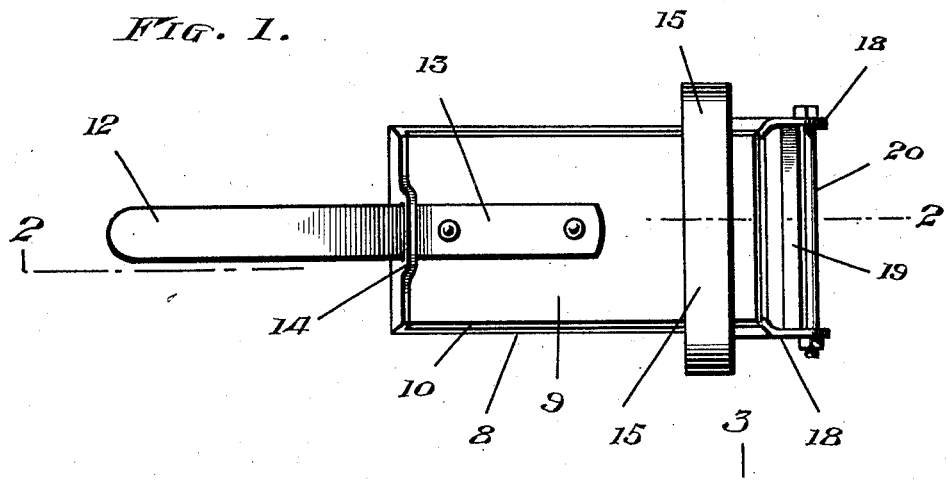
Figure 1 is a plan view of the improved device.
Figure 2:
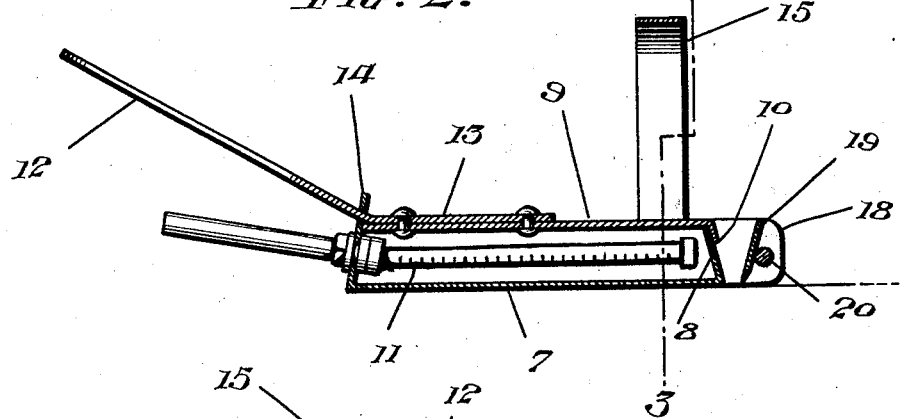
Fig. 2 is a longitudinal section on the line 2—2 of Fig. 1.

The casing is composed of suitable sheet metal and has the bottom or active side 7 provided with rim 8 which is inclined inwardly, and a cover or back 9 having a marginal flange or apron 10 to fit over the rim 9.

The side 7 can be heated by any suitable source of heat, either by liquid fuel or gas, or by electricity, and, as shown, a hydrocarbon burner 11 extends through one end of the rim 8 for directing flames against the side 7 to furnish the heat, and the fuel can be supplied by a hose connected to the outer end of said burner or nozzle. The burner is shown at the rear end of the casing.

The casing is provided with a pair of handles which also serve as means for holding the parts or sections of the casing assembled, as well as providing for the convenient manipulation of the device. Thus, a longitudinal handle 12 is secured, as at 13, on the cover or back 9 of the casing near the rear end thereof, and, as shown, extends at an obtuse angle from the cover 9, and is insertable rearwardly through a slotted portion 14 extending from the rear end of the rim 8, whereby to hold the rear ends of the two sections or parts of the casing together against separation.

Figure 3:
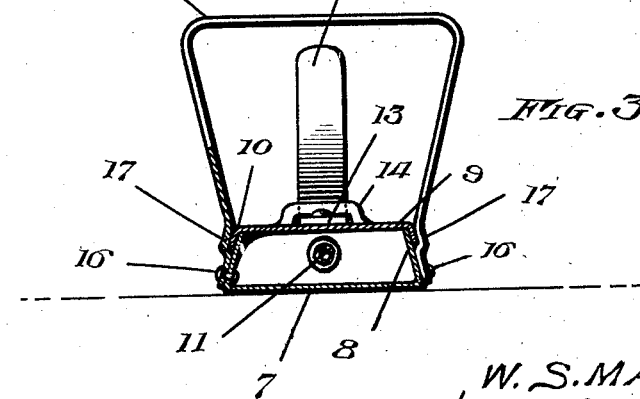
Fig. 3 is a cross section on the line 3—3 of Fig. 2.

A second handle 15 of bail shape is provided near the forward end of the casing, being disposed transversely and having its ends secured, as at 16, to the rim 8 near the forward end thereof. The portions of the handle 15 adjacent to the ends thereof and the cover 9 are offset or formed, as at 17, so as to be snapped over the edges or flange 10 of the cover to hold the cover on the rim. Thus, in assembling the parts of the casing, the cover is inserted rearwardly through the handle 15 so that the handle 12 slides through the portion 14, with the forward end of the cover spaced above the bottom part of the casing. Then, when the rear end of the cover strikes the portion 14, the forward end of the cover is depressed or swung against the bottom part, thereby snapping the side edges of the cover past and behind the portions 17 of the handle 15, which holds the cover snugly on the rim 18, as seen in Fig. 3. The handle 12 in extending at an angle will prevent the cover from sliding forwardly on the rim 8, and the parts of the casing are thus held together firmly. By raising the forward end of the cover from the rim 8, the cover can be disengaged from the handle 15, for removing the cover by sliding it forwardly. With this arrangement no separate means for holding the casing sections or parts together are necessary, and, furthermore, the handles provide for convenience in manipulating the casing. One hand can grasp the handle 15 for pressing the casing against the painted surface and to assist in moving the device over the surface while the other hand can grasp the handle 12 for pushing or pulling the device. The handle can be heat insulated or of suitable material to prevent the hands being burned.

The device is also provided with a scraper for removing the blistered or loosened paint, and, for this purpose, tongues 18 are secured to the rim 8 at the forward end thereof and project beyond said forward end of the rim, and a transverse scraper blade 19 is disposed between said tongues beyond the forward end of the casing with its ends abutting the tongues 18. A clamping bolt 20 extends along the blade 19 and through the tongues 18 for springing the tongues toward one another for clamping the blade 19 in its adjusted position. The blade 19 preferably bears against the bolt 20, and when said bolt is loosened, the blade can be adjusted to different angles and to project the sharpened edge slightly beyond the side 7 of the casing, in order to present the blade to the paint in the desired position. The tongues 18 are bendable so that they can be sprung or bent toward one another to clamp the blade 18.

In using the device, it is pressed against the painted surface and pulled, whereby the heated side will blister or loosen the paint, without danger of burning the wood, and the scraper blade 19 in following the casing, will scrape the loosened paint off of the surface of the wood during the strokes or operation. The casing or box is moved slowly over the surface and will effectively loosen and remove the paint without the usual work and time, thereby effecting a saving.

Having thus described the invention, what is claimed as new is:

1. A paint removing device comprising a casing having an active side, means for heating said side of the casing from within the casing, a transverse handle carried by the casing near one end for the pressing against the painted surface, and a handle extending from the other end of the casing for moving the casing lengthwise.

2. A paint removing device comprising a casing having an active side, means for heating said side from within the casing, a scraper blade beyond one end of the casing, means for adjustably supporting the blade from the casing for edgewise and angular adjustments, and means carried by the casing for manually pressing it against the painted surface and moving the casing.

3. A paint removing device comprising a casing having an active side, means for heating said side from within the casing, a scraper carried by the casing beyond one end thereof, a handle carried by the casing near said end for pressing the casing against the painted surface, and a handle extending from the other end of the casing for pulling the casing.

4. A paint removing device comprising a casing having an active side, means for heating said side from within the casing, tongues extending from end of the casing, a scraper blade between and abutting said tongues, means for clamping the blade between the tongues, and means carried by the casing for manipulating it.

5. A paint removing device comprising a casing composed of two separable sections, a handle carried by one section and arranged to slidably engage the other section, and another handle carried by one of said sections and having a resilient portion to snap into engagement with the other section for holding the sections together.

6. A paint removing device comprising a casing composed of separable sections, and handles each carried by one section of the casing and engageable with the other for holding the casing sections assembled.

7. A paint removing device comprising a casing composed of seperable sections, a handle extending from one end of one section, the corresponding end of the other section having a portion through which said handle is insertable, and another handle carried by one section for the engagement of the other section to hold the sections together.

8. A paint removing device comprising separable sections adapted to fit together, a handle extending from one end of one section, the corresponding end of the other section having a slotted portion through which said handle is insertable longitudinally, and a transverse bail-shaped handle terminally secured to the lastnamed section near the opposite end through which the firstnamed section is movable, when inserting said handle through said slotted portion, the lastnamed handle having portions to snap into engagement with the edges of the firstnamed section for holding the sections together.

In testimony whereof I hereunto affix my signature.

WILLIAM SHERMAN MANLEY.